Figure 3:
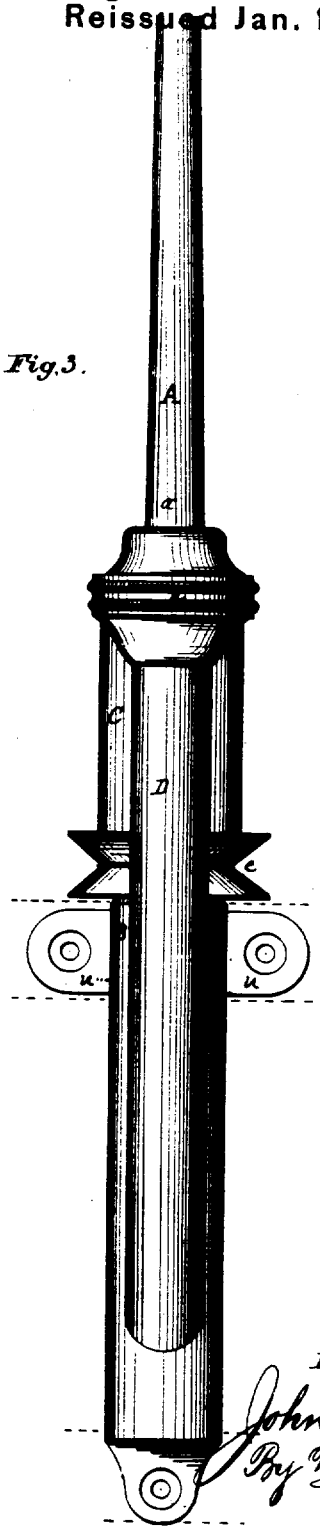

2 Sheets—Sheet 1.

J. E. ATWOOD.

Assignor, by mesne assignments, to F. J. RABBETH & FALES, JENKS & SONS.

Spindle for Spinning-Frames.

No. 8,539. Reissued Jan. 14, 1879.

*Fig. 1.*

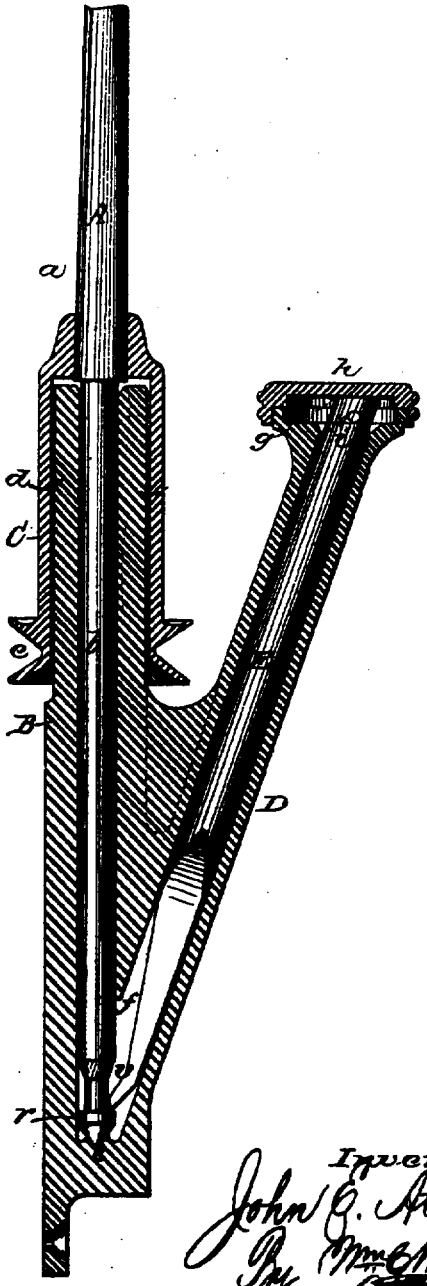

8,539. SPINDLES FOR SPINNING-FRAMES. John E. Atwood, Stonington, Conn., assignor, by mesne assignments, to Frank J. Rabbeth and Fales, Jenks & Sons, Pawtucket, R. I. Patent No. 50,049, dated Sept. 18, 1866. Filed Mar. 9, 1878.

*Brief.*—By reducing the wear in the bearings, and locating the whirl with reference to said bearings, the spindles are prevented from being drawn aside or out of line. The oil-tube communicates with the interior of the tubular bolster, and the oil is drawn upward by the rotation of the spindle. The top of the bolster is shielded from dust and dirt.

*Claim.*—1. The combination, with a spindle and a downwardly-projecting cylindrical sleeve, substantially as hereinbefore described, of an oil-tube containing the spindle, and having at its upper end a bolster-bearing surrounded and inclosed by said sleeve, substantially as described.

2. The combination, with a live spindle, a tubular bolster-bearing extended above its supporting-rail, and a tubular sleeve, substantially as hereinbefore described, rotating with the spindle, free from and shielding the bolster-bearing, of an oil-chamber and an oiling-inducer for supplying the spindle with oil while in service, substantially as described.

3. The combination, with a live spindle, of a tubular sleeve, substantially as described, mounted on and rotating with the spindle, a tubular bolster-bearing extended upward from its supporting-rail into and free from the sleeve, and provided with an oiling-inducer entering below the rotating sleeve, substantially as described, whereby the bolster may be oiled while the tubular sleeve is in place around the bolster, and the latter protected from dust and dirt, as set forth.

4. The combination of a live spindle, a tubular bolster extended above its supporting-rail and downward to an oil-chamber, a tubular sleeve, substantially as described, rotating with the spindle, free from and shielding the bolster, and an oiling-inducer for supplying the spindle with oil, substantially as described.

5. The combination, with a live spindle and a tubular bolster, the upper portion of which is inclosed by a sleeve provided with a whirl connected with the spindle at a point above the bolster, of an oil-inducer which admits of the oiling of the spindle while in operation, substantially as described.

6. The combination, with a live spindle and a tubular bolster which extends above the spindle-whirl, and which has its upper end inclosed, when the spindle is in service, by a rotating sleeve, substantially as described, mounted on the spindle, of an oiling-inducer, which supplies oil to the bolster and step, substantially as described.

7. The inclined tube D, provided at its upper end with a receptacle, *g*, in combination with the bolster B and spindle A, provided with a sleeve which surrounds the bolster and carries a whirl, substantially as described, and for the purposes specified.

8. The combination, with the spindle, of the bar or rod E, suspended within the tube D and in relation with the annular shoulder *r*, near the lower end of the spindle, substantially as described.

9. The combination, with the live spindle, the sleeve, substantially as described, and the shielded bolster, of the oiling-inducer and its cap, substantially as described, whereby the oil supplied to the spindle is guarded against undue exposure.

10. The combination, with a tapered live spindle, of a rotating sleeve, substantially as described, which protects and surrounds the bolster, and is adhesively mounted on the tapered spindle above the bearing, substantially as described.

Witnesses:
Philip T. Farnell
H. Bertle.

Inventor:
John E. Atwood
By Wm. C. Wood
Attorney.

N. PETERS, PHOTO-LITHOGRAPHER, WASHINGTON, D. C.

2 Sheets—Sheet 2.

J. E. ATWOOD.

Assignor, by mesne assignments, to F. J. RABBETH & FALES, JENKS & SONS.

Spindle for Spinning-Frames.

No. 8,539. Reissued Jan. 14, 1879.

Attest.
Philip F. Larner
A. W. Cauldwell

Inventor.
John E. Atwood
By Munn & Co.
Attorney

N. PETERS, PHOTO-LITHOGRAPHER, WASHINGTON, D. C.

UNITED STATES PATENT OFFICE.

JOHN E. ATWOOD, OF STONINGTON, CONNECTICUT, ASSIGNOR, BY MESNE ASSIGNMENTS, TO FRANK J. RABBETH AND FALES, JENKS & SONS, OF PAWTUCKET, RHODE ISLAND.

IMPROVEMENT IN SPINDLES FOR SPINNING-FRAMES.

Specification forming part of Letters Patent No. 58,046, dated September 18, 1866; Reissue No. 8,539, dated January 14, 1879; application filed March 9, 1878.

*To all whom it may concern:*

Be it known that I, JOHN E. ATWOOD, formerly of Mansfield, Connecticut, but now of Stonington, in the county of New London and State of Connecticut, have invented certain new and useful Improvements in Spindles for Spinning-Frames; and I do hereby declare that the following is a full, clear, and exact description of the same, reference being had to the accompanying drawings, making a part of this specification, in which—

Figure 2:
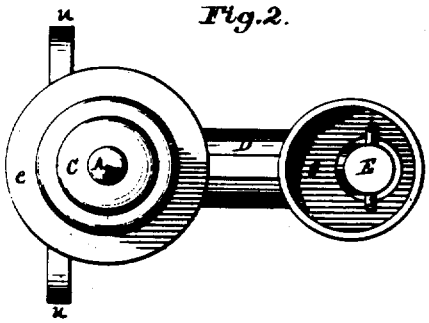

Figure 1 is a vertical transverse section of the spindle-bearings and oil-tube, with spindle in proper position and its sleeve in section. Fig. 2 is a plan or top view of the same with cap of oil-tube removed. Fig. 3 is a front elevation thereof.

Similar letters of reference indicate corresponding parts in all the figures.

This invention consists in an improvement in self-oiling spindles for spinning-frames, whereby, while the spindles are in their normal position and in operation, their bearings are protected and readily oiled. I am thereby enabled to greatly reduce the liability of undue wear and friction incident to imperfect lubrication and to the presence of dust and dirt, which has heretofore been experienced when any portions of the spindle-bearings are continuously exposed, or when they are exposed for the purpose of oiling them. By thus reducing the liability of wear in the bearings and locating the whirl with reference to the spindle-bearings, as hereinafter described, I prevent the spindles from being drawn aside or out of line.

To enable others to understand the construction and operation of my invention, I will proceed to describe it with reference to the drawings.

A denotes the spindle, which belongs to the class known as "live spindles." The upper portion, *a*, of said spindle is tapered, for purposes well known. The lower portion, *b*, at its lower end, is provided with a conical bearing and a step, *c*.

B denotes a tubular bolster-bearing, which is fitted to receive the lower portion of the spindle, and contains the step *c*, before referred to. Near the lower end of the spindle is an annular groove, which is so shaped as to afford an annular shoulder, *r*, Fig. 1. The exterior *d* of the upper end of the bearing B is cylindrical, and adhesively secured to the lower end of the tapering upper portion of the spindle is a downwardly-projecting cylindrical sleeve, C, which is of such size as to closely surround the bolster-bearing without being in contact therewith. On the lower end of this sleeve C is a whirl, *e*, which is located considerably below the top of the bolster-bearing, as heretofore, so that undue lateral strain upon the spindle through the tension of its band on the whirl is obviated. The bearings for the spindles are mounted in a frame by means of ears *u*, drilled for the reception of screws or bolts, and by which they are attached to rails, as indicated in dotted lines in Fig. 3.

D denotes an oil induct or tube, which is formed in the same piece of metal as the bolster. This tube communicates with the interior of the tubular bolster, as shown at *f*. It is enlarged at its upper end, *g*, and is covered by a screw-cap, *h*. Oil is poured into the receptacle *g*, and it passes downward into the oil-chamber *v*, in and below which the step *c* is located, and from which the oil is supplied to the bolster-bearing, it being drawn upward by the rotation of the spindle within the space intervening between the spindle and the inner surface of the lower portion of the bolster-tube.

E denotes a bar or rod somewhat less in diameter than the interior of the tube D, so that when placed therein, as shown, an annular space or induct is afforded for the passage of oil into the oil-chamber. The lower end of this rod is formed to project above and engage with the annular shoulder *r* near the bottom of the spindle when the latter is lifted, and the cap *h*, by contact with the upper end of the rod, serves to secure it in position.

In order that the rod or bar E may not bear upon the spindle, said bar is provided at its upper end with a lateral supporting-pin, *i*, which rests upon the bottom of the oil-receptacle *g*, as shown in Fig. 2.

It will be seen that my spindle may be readily supplied with oil without exposing the upper portion of the bolster-bearing, and also without in any manner affecting the continuous operation of the spindle.

It will also be seen that the sleeve C, which protects the bolster, being carried by the spindle, by reason of its adhesion thereto is not capable of any independent vibration, which might affect its proper operation, and by its close engagement with the spindle absolutely prevents the downward passage of dust or dirt from above the sleeve.

I am aware that English Letters Patent of Mason & Collier, No. 14,140, O. L., 1852, illustrates and describes a fly-frame spindle mounted within a bolster, which extends upward from its supporting-rail, and is provided with an oiling-induct (but no oil-chamber) near its lower end; and I also know that the bobbin thereof is shown to be chambered in a tubular form, so as to surround the bolster; but this bobbin is not carried by the spindle, and a space necessarily exists between them in practice on account of their independent movements, which space admits of the descent of dust, dirt, and fiber to the bolster.

I am also aware that English Letters Patent of Maden & Wheater, No. 912 of 1861, illustrates and describes a live spindle, slotted at its upper end, carrying a bobbin, which is in the form of a rotating tube, is provided with a lateral pin, and incloses a bolster extended above its supporting-rail; but this bobbin is so attached to the spindle as to be liable to independent vibration upon it, and the bolster has no oiling-induct.

I am also aware that English Letters Patent of Wright, No. 7,127, O. L., 1836, illustrates and describes a spindle-step inclosed by a sleeve attached to the spindle, and also that it is therein suggested that an upper and a lower bearing for a spindle may be located within a chamber, and that the upper bearing may be inclosed by a sleeve; but said Letters Patent exhibit no means for oiling the spindle-bearings, except by lifting the spindle wholly from the chamber. I do not, therefore, claim the several devices or elements as shown in the above-described patents; but What I do claim is—

1. The combination, with a spindle and a downwardly-projecting cylindrical sleeve, substantially as hereinbefore described, of an oil-tube containing the spindle, and having at its upper end a bolster-bearing surrounded and inclosed by said sleeve, substantially as described.

2. The combination, with a live spindle, a tubular bolster-bearing extended above its supporting-rail, and a tubular sleeve, substantially as hereinbefore described, rotating with the spindle, free from and shielding the bolster-bearing, of an oil-chamber and an oiling-induct for supplying the spindle with oil while in service, substantially as described.

3. The combination, with a live spindle, of a tubular sleeve, substantially as described, mounted on and rotating with the spindle, a tubular bolster-bearing extended upward from its supporting-rail into and free from the sleeve, and provided with an oiling-induct entering below the rotating sleeve, substantially as described, whereby the bolster may be oiled while the tubular sleeve is in place around the bolster, and the latter protected from dust and dirt, as set forth.

4. The combination of a live spindle, a tubular bolster extended above its supporting-rail and downward to an oil-chamber, a tubular sleeve, substantially as described, rotating with the spindle, free from and shielding the bolster, and an oiling-induct for supplying the spindle with oil, substantially as described.

5. The combination, with a live spindle and a tubular bolster, the upper portion of which is inclosed by a sleeve provided with a whirl connected with the spindle at a point above the bolster, of an oil-induct which admits of the oiling of the spindle while in operation, substantially as described.

6. The combination, with a live spindle and a tubular bolster which extends above the spindle-whirl, and which has its upper end inclosed, when the spindle is in service, by a rotating sleeve, substantially as described, mounted on the spindle, of an oiling-induct, which supplies oil to the bolster and step, substantially as described.

7. The inclined tube D, provided at its upper end with a receptacle, *g*, in combination with the bolster B and spindle A, provided with a sleeve which surrounds the bolster and carries a whirl, substantially as described, and for the purposes specified.

8. The combination, with the spindle, of the bar or rod E, suspended within the tube D and in relation with the annular shoulder *r* near the lower end of the spindle, substantially as described.

9. The combination, with the live spindle, the sleeve, substantially as described, and the shielded bolster, of the oiling-induct and its cap, substantially as described, whereby the oil supplied to the spindle is guarded against undue exposure.

10. The combination, with a tapered live spindle, of a rotating sleeve, substantially as described, which protects and surrounds the bolster, and is adhesively mounted on the tapered spindle above the bearing, substantially as described.

JOHN E. ATWOOD.

Witnesses:
EUGENE ATWOOD,
C. H. COWAN.